US012623285B2

(12) United States Patent
Kleinhans et al.

(10) Patent No.: US 12,623,285 B2
(45) Date of Patent: May 12, 2026

(54) FILTER DEVICE FOR AN ADDITIVE MANUFACTURING DEVICE

(71) Applicant: EOS GmbH Electro Optical Systems, Krailling (DE)

(72) Inventors: Ulrich Kleinhans, Prittriching (DE); Philip Stroebel, Weidenbach (DE)

(73) Assignee: EOS GmbH Electro Optical Systems, Krailling (DE)

( * ) Notice: Subject to any disclaimer, the term of this patent is extended or adjusted under 35 U.S.C. 154(b) by 703 days.

(21) Appl. No.: 17/921,504

(22) PCT Filed: Jun. 2, 2021

(86) PCT No.: PCT/EP2021/064881
§ 371 (c)(1),
(2) Date: Oct. 26, 2022

(87) PCT Pub. No.: WO2021/254783
PCT Pub. Date: Dec. 23, 2021

(65) Prior Publication Data
US 2023/0264263 A1 Aug. 24, 2023

(30) Foreign Application Priority Data
Jun. 17, 2020 (DE) .......................... 102020116030.5

(51) Int. Cl.
*B22F 10/70* (2021.01)
*B01D 46/00* (2022.01)
(Continued)

(52) U.S. Cl.
CPC .......... *B22F 10/28* (2021.01); *B01D 46/0093* (2013.01); *B01D 46/04* (2013.01);
(Continued)

(58) Field of Classification Search
CPC .......... B22F 10/20; B22F 10/22; B22F 10/25; B22F 10/28; B01D 46/04; B29C 64/141; B29C 64/153; B29C 64/357; B29C 64/364
See application file for complete search history.

(56) References Cited

U.S. PATENT DOCUMENTS 5,527,019 A 6/1996 Schwarz
5,571,298 A * 11/1996 Buck ..................... F01N 3/0212
422/174
(Continued)

FOREIGN PATENT DOCUMENTS

CN 109248508 1/2019
DE 4130640 3/1993
(Continued)

OTHER PUBLICATIONS

German Search Report for Application No. DE 102020116030.5, dated Jan. 14, 2021, 7 pages.
(Continued)

*Primary Examiner* — Yung-Sheng M Tsui
*Assistant Examiner* — Melody Tsui
(74) *Attorney, Agent, or Firm* — Polsinelli PC

(57) ABSTRACT

Disclosed is a filter system for an additive manufacturing device for purifying a process gas of the additive manufacturing device wherein, in order to purify a volume of process gas during operation, the filter system has at least one permanent filter. The permanent filter is configured so as to be thermally stable in a manner such that during operation, the permanent filter is stable at a temperature of more than 110° C. Further disclosed is an additive manufacturing device as well as an additive manufacturing process.

10 Claims, 4 Drawing Sheets

(51) Int. Cl.
| | |
|---|---|
| *B01D 46/04* | (2006.01) |
| *B01D 46/48* | (2006.01) |
| *B22F 10/28* | (2021.01) |
| *B33Y 10/00* | (2015.01) |
| *B33Y 30/00* | (2015.01) |

(52) U.S. Cl.
CPC .............. *B01D 46/48* (2013.01); *B22F 10/70* (2021.01); *B33Y 10/00* (2014.12); *B33Y 30/00* (2014.12)

(56) References Cited

U.S. PATENT DOCUMENTS

| | | | |
|---|---|---|---|
| 5,873,918 A | 2/1999 | Dillman | |
| 6,905,533 B2 | 6/2005 | Becker et al. | |
| 11,667,082 B2 * | 6/2023 | Fey ........................ | B33Y 50/02 264/308 |
| 2003/0200867 A1 | 10/2003 | Becker et al. | |
| 2017/0173879 A1 * | 6/2017 | Myerberg ............... | B22F 12/53 |
| 2018/0043614 A1 * | 2/2018 | Greenfield ........... | B29C 64/153 |
| 2018/0281284 A1 * | 10/2018 | Elgar ................... | B29C 64/371 |
| 2019/0022940 A1 * | 1/2019 | Hofmann ............. | B29C 64/268 |
| 2019/0039313 A1 | 2/2019 | Fey et al. | |
| 2019/0084236 A1 * | 3/2019 | Oliver ................... | B22F 12/226 |
| 2019/0190000 A1 * | 6/2019 | Herle .................... | H01G 11/84 |
| 2019/0224782 A1 * | 7/2019 | Hofmann ................ | B03C 1/247 |
| 2020/0254523 A1 * | 8/2020 | Beauchamp ........... | B33Y 40/00 |
| 2020/0391295 A1 * | 12/2020 | Dorval Dion ........... | B22F 10/34 |
| 2021/0276098 A1 | 9/2021 | Hensen et al. | |
| 2021/0308769 A1 * | 10/2021 | Brown ............... | B01D 46/2403 |
| 2022/0379256 A1 * | 12/2022 | Mansell ................... | B22F 3/003 |
| 2023/0150030 A1 * | 5/2023 | Brown .................... | B22F 10/28 134/2 |

FOREIGN PATENT DOCUMENTS

| | | | | |
|---|---|---|---|---|
| DE | 4305915 | 11/1994 | | |
| DE | 19524399 | 1/1997 | | |
| DE | 10218491 | 1/2004 | | |
| DE | 102010026139 | 1/2012 | | |
| DE | 102017001372 | 8/2018 | | |
| DE | 102018115561 | 1/2020 | | |
| WO | WO-2017055207 A1 * | 4/2017 | ............. | B03C 3/155 |
| WO | 2017134044 | 8/2017 | | |
| WO | 2018149544 | 8/2018 | | |
| WO | WO-2019175556 A1 * | 9/2019 | ............. | B22F 12/70 |
| WO | 202002633 | 1/2020 | | |
| WO | 2020017952 | 1/2020 | | |
| WO | 2020053567 | 3/2020 | | |

OTHER PUBLICATIONS

International Search Report Application No. PCT/EP2021/064881, dated Aug. 10, 2021, 5 pages.

* cited by examiner

B-B

FILTER DEVICE FOR AN ADDITIVE MANUFACTURING DEVICE

TECHNICAL FIELD OF THE INVENTION

The present invention relates to a filter system for an additive manufacturing device, to an additive manufacturing device with a filter system of this type, as well as to a process for the additive manufacture of a component.

BACKGROUND OF THE INVENTION

When producing prototypes and now also in mass production, additive manufacturing processes are becoming increasingly relevant. In general, the term "additive manufacturing processes" should be understood to mean those manufacturing processes in which, as a rule based on digital 3D construction data, a manufactured product or component is built up by depositing material. Building is usually accomplished by applying a build material in layers and selectively solidifying it. A synonym for additive manufacturing which is often also employed is the term "3D printing"; the production of models, samples and prototypes using additive manufacturing processes is often described as "Rapid Prototyping" and the production of tools is described as "Rapid Tooling".

Selective solidification of the build material is often carried out by repeatedly applying thin layers of the usually powdered build material one over another and, by means of spatially restricted irradiation, for example by means of light or heat radiation, solidifying it at those positions intended to form part of the manufactured product to be produced following manufacture. Examples of processes operating by irradiation are "selective laser sintering" or "selective laser melting". The powder particles of the build material are partially or completely melted during the course of solidification with the aid of the energy introduced locally to that position by the irradiation. After cooling, these powder particles are then bonded together into the form of a solid body.

In production of this type, it is frequently necessary for a process gas to be conveyed through the process chamber (in particular with a fan) for the purposes of cooling or discharge. The process gas which emerges in this regard usually entrains particles of the build material and/or particles which arise from the process, in particular metal condensates when metallic build materials are used, some of which are highly reactive and can react even at room temperature with small quantities of oxygen in the air, with the release of a great deal of heat.

In order to prevent contamination of the process gas with the particles, for example in order to counteract gradual contamination of the process chamber and/or the fan, it is necessary to filter the process gas after it leaves the process chamber. However, because of the high reactivity of the particles, in the region of filters on which the particles which are entrained in the process gas collect, uncontrolled filter fires or dust explosions may occur. This risk is higher when, for example, a corresponding filter chamber is opened in order to exchange the filter or filters, whereupon the probability of reaction is increased because of the associated increased supply of oxidizing agents, for example oxygen from the air.

SUMMARY OF THE INVENTION

An objective of the present invention is to provide an improved or alternative filter system or a manufacturing device provided with a filter which enables the filter to be removed safely when exchanging the filter in an additive manufacturing device.

In this regard, the invention is concerned with the field of additive manufacturing, wherein this manufacturing is carried out in a (closed) process chamber through which a process gas is conveyed and which is then filtered. The term "process gas" as used here should be understood to mean a gas which is discharged from a process chamber, in particular sucked out, and which, depending on the production process, may also comprise or be an inert gas. In the process gas, both unsolidified fractions of a build material as well as by-products of the process such as condensates, for example metal condensates, may be present. Components of this type which are entrained in the process gas are amalgamated into the term "particle".

A filter system in accordance with the invention for an additive manufacturing device serves to purify a process gas of the additive manufacturing device. In order to purify a volume of process gas during operation, the filter system has at least one (dimensionally stable) permanent filter which is preferably configured so as to be thermally stable, preferably combustion resistant, in a manner such that during operation, the permanent filter is stable at a temperature of more than 110° C.

In the context of the invention, the term "permanent filter" (or durable filter) should be understood to mean filters which, in contrast to the usual filter models, can stay in place for many (multiple) cycles and/or permanently during the operation of the additive manufacturing device. To this end, a permanent filter is cleaned after a certain time, i.e. the filtrate is removed or ejected and with it, filtrate is removed from the filter pores or the filter material and/or a filter cake lying on the filter. A permanent filter must contain a filter material the mechanical stability of which must be high enough for it not to be destroyed or damaged during its intended cleaning. An example of a permanent filter is a (or comprises a) metal filter with a metal mesh or metal screen as a filter material or a filter with a filtration medium produced from glass wool or ceramic. In particular, a filter with a polyester textile is not considered to be a permanent filter, at least insofar as it does not have sufficient mechanical strength and thermal stability. The advantage of a permanent filter is that a risk of fire from heating a filtrate in the form of dust is significantly reduced, on the one hand by means of the generally comparably good thermal conduction of the filter material and on the other hand because a permanent filter does not have to be exchanged and it can be cleaned under clearly defined, inert conditions. Cleaning may, for example, be carried out by means of a pressure surge against the direction of the process gas, for example with an inert gas such as nitrogen, and by means of this removing filtrate clogging the pores and/or a filter cake lying on the filter so that it can drop into a container. The good thermal conductivity of the permanent filter is especially positive when the penetration of oxidizing agents, for example oxygen, may cause reactions because of leaks in a system and/or when changing the filter and/or when opening the process chamber.

An additive manufacturing device in accordance with the invention for the manufacture of a component in an additive manufacturing process comprises a process chamber, a feed system for introducing a build material into the process chamber in layers, an irradiation unit for selectively solidifying build material in the process chamber and a filter system in accordance with the invention for purifying a process gas (discharging from the process chamber) of the additive manufacturing device.

A process in accordance with the invention for the additive manufacture of a component in an additive manufacturing process using an additive manufacturing device comprises the following steps:

introducing at least one layer of a build material into a process chamber of the manufacturing device, selectively solidifying the build material in the process chamber by means of an irradiation unit, and purifying a volume of a process gas (which is discharged from the process chamber and in particular moved in a closed circuit) of the additive manufacturing device by means of a filter system in accordance with the invention.

The invention also concerns a use of a permanent filter for purifying process gas in a filter system for an additive manufacturing device, preferably for use in a filter system in accordance with the invention.

The invention also concerns a permanent filter designed for purifying process gas in a filter system for an additive manufacturing device, preferably for purifying process gas in a filter system in accordance with the invention.

Further particularly advantageous embodiments and further developments of the invention are defined in the dependent claims as well as in the description below, wherein the independent claims of a category of claims may also be read onto the dependent claims and exemplary embodiments of another category of claims in an analogous manner, and in particular, individual features of different exemplary embodiments or variations may also be combined to form new exemplary embodiments or variations.

In accordance with a preferred filter system, the permanent filter is configured so as to be thermally stable in a manner such that the permanent filter is stable at a temperature of more than 150° C., preferably more than 250° C., preferably more than 350° C., particularly preferably more than 500° C.

Correspondingly, the purification of process gas in accordance with a preferred process for additive manufacture is carried out at a process gas temperature of more than 40° C., preferably at a process gas temperature of more than 110° C., preferably at a process gas temperature of more than 150° C., preferably at a process gas temperature of more than 200° C., particularly preferably at a process gas temperature of more than 250° C., more particularly preferably at a process gas temperature of more than 300° C.

The process gas temperature is preferably in the range from 40° C. to 60° C. However, a higher process gas temperature may also be envisaged. Depending on the type of build material and the filter, a preferred temperature range is between 0° C. and 1000° C., in particular between 40° C. and 250° C., or in fact between 60° C. and 100° C. In this regard, the thermal stability of the permanent filter must in each case be stable at a temperature that is higher than the process gas temperature.

In accordance with a preferred filter system, the permanent filter is configured so as to be dimensionally stable in a manner such that a service period for the permanent filter during the operation of the filter system is essentially constant. The term "service period" means the period between necessary cleans of the filter, i.e. the period over which the filter can carry out its intended function. In the case of a normal commercial filter, this would correspond to the lifetime, i.e. the time until the filter has to be exchanged after some cleans, for example after 200 cleans. Because a permanent filter in effect does not have to be exchanged, in this case the term service period is employed.

In accordance with a preferred filter system, the permanent filter comprises a metal filter, wherein the metal filter is preferably constructed from at least one steel, in particular corrosion-resistant steel and/or from a nickel-based alloy and/or from copper and/or from mixtures or alloys thereof. A preferred corrosion-resistant steel is stainless steel. The advantage of a metal filter is good temperature and oxidation resistance and comparatively high thermal conductivity, which prevents spontaneous ignition of the condensate and/or can better withstand it or slow it down. A corrosion resistance is advantageous because in this case, the filter can be heated up and the filtrate can be oxidised in a controlled manner. Further advantages of a metal filter are high strength/inherent rigidity, which supports the basic function of the permanent filter and results in a long service life even in the case of many cleans (many pressure surges), a smooth surface structure, which permits easy cleaning because the filter cake only adheres lightly, a high abrasion resistance as well as no particle detachment. In addition, a metal filter permits good flow, which results in a low pressure drop across the filter and therefore the filter can be loaded more heavily compared with other filter materials which have high pressure drops (low flows). In addition, a metal filter has a chemical and thermal resistance, whereupon the risk of fire is significantly reduced. In addition, an operation at higher gas temperatures (more than 500° C. or even more than 800° C.) may be envisaged. Preferably, the metal filter has a defined, in particular regular arrangement of the filter pores and is preferably manufactured from a woven fabric or a perforated plate or a mesh. A narrow pore size distribution with more than 50 pores per $cm^2$, in particular more than 100 pores per $cm^2$, is also preferred.

In accordance with a preferred filter system, the permanent filter comprises a ceramic filter and/or a glass wool filter as an alternative or to supplement a metal filter. A mixture of different filter types (i.e. a metal filter, ceramic filter and glass wool filter) is preferred, depending on the use. To this end, for example, the good thermal conductivity of a metal filter may be combined with advantages of a ceramic or glass wool filter. As an example, different filter stages may be constructed in one filter.

In accordance with a preferred filter system, a mesh size (or pore size) of a filter material of the permanent filter is no more than 30 μm, preferably no more than 20 μm, preferably no more than 8 μm. Preferably, in this regard, the mesh size (or pore size) is at least 0.5 μm, Preferably at least 1 μm, preferably at least 2 μm, particularly preferably 3 μm. In this case, it should be noted that too large a mesh size will result in unsatisfactory filtration. If it is too small, then the pressure drops will be too high and the gas flow through the filter will no longer be sufficient.

In accordance with a preferred filter system, the permanent filter has filter structures with a preferred diameter of between 1 μm and 1000 μm.

In accordance with a preferred filter system, a (wire) diameter of filaments which form a filter material of the permanent filter is less than 100 μm, preferably less than 50 μm, preferably less than 20 μm, in particular less than 10 μm, particularly preferably less than 5 μm. In this regard, however, the diameter is preferably more than 1 μm.

If the metal filter comprises a mesh produced from metal wires, then depending on the application, metal wire diameters of at least 1 μm are preferred, but preferably they are thinner than 100 μm. Preferably, the metal wires with the aforementioned preferred dimensions are in the form of filaments.

In addition, the permanent filter may comprise a support structure which is designed to support the permanent filter (in particular its filter surface), to keep it in shape and/or to increase the mechanical strength of the filter material. Particularly in the case of cleaning a permanent filter by means of a pressure surge, a support structure of this type is advantageous. Clearly, a support structure of this type must not substantially impair the function of a filter. Therefore, the support structure is preferably constructed in the manner of a mesh or a screen, for example in the form of a wire mesh or a perforated extensive element, for example an apertured sheet. If a support structure comprises wires, then they are preferably thicker than the filaments/wires of the filter material and preferably have a thickness of more than 100 μm, preferably more than 200 μm, however preferably less than 1000 μm, in particular less than 700 μm.

In accordance with a preferred embodiment, the support structure runs parallel to the filter material of the permanent filter and preferably runs at least in a subarea on its dirty gas side and/or on its clean gas side. Because contamination of the support structure also has to be taken into consideration on the dirty gas side, also for a better passage of gas, it preferably has a mesh structure with a mesh size of more than 1 mm.

However, the support structure may also be integrated into the filter material, preferably in the form of reinforced or stronger elements of the filter material. In this regard, a preferred filter material has a support structure produced from parallel or mesh like wires, for example a cylindrical filter which has rings produced from wires of the support structure in its curved surface or a pleated filter with star-shaped wires of the support structure. A mesh produced from parallel (warp) wires in one direction and with weft wires woven orthogonally or at an angle thereto is also preferred. In accordance with a preferred embodiment, at least some (warp) wires are wires of the support structure (preferably with a thickness of between 0.1 mm and 0.5 mm), wherein between these (warp) wires, thinner (warp) wires of the filter material run (preferably with a thickness of between 1 μm and 100 μm). The (weft) wires are then preferably wires of the filter material, wherein particularly preferably, some (weft) wires may also be wires of the support structure. In this manner, the support structure forms a coarse mesh in which the filter material is woven as a finer mesh.

Preferably, a permanent filter is configured in a manner such that it has a sufficient filtration at a filter surface load of between 0.2 m/min and 1.3 m/min (volume flow/filter surface area). The filter surface load through the process gas is advantageously a lower value rather than a higher value. Values which are too low, however, signify that the filter surface is unused and unnecessary costs arise. Thus, during operation, a filter surface load of 0.2 to 1.3 m/min is preferred, preferably less than 0.8 m/min, more preferably less than 0.6 m/min.

Preferably, the thermal conductivity of the permanent filter, at least of its filter material, in particular that of the wires or filaments of a woven mesh, is more than 0.5 W/(m·K), in particular more than 10 W/(m·K), particularly preferably more than 20 W/(m·K). This has the advantage that the risk of a filtrate fire is reduced due to the rapid dissipation of local heat. Because, for example in a polyester filter, the thermal conductivity is not very good, ignition will even occur at lower temperatures, but not with such a permanent filter.

In accordance with a preferred filter system with a filamentous fabric, the weave is regular and/or random. The advantage with such a design is a robust construction, low damage during cleaning and therefore a particularly good durability.

In accordance with a preferred filter system, a dirty gas side of the permanent filter coming into contact with the process gas to be purified has a preferably meandering pleated surface, at least in regions. In this regard, in order to form a pleated surface of the dirty gas side, preferably, a number of folds are disposed in the surface. Particularly preferably in this regard, the folds for pleating are folds in a continuous fabric. As an alternative, the folds are preferably welded together and/or bonded together. The outer fabric is therefore pleated in this preferred embodiment and not bent into curves (even when this can be entirely preferred in other applications). Pleating significantly increases the filter surface area for the same volume, for example by a factor of 2 to 3. Moreover, there is a non-linear relationship between the filter surface area and the lifetime. Doubling the filter surface area (for example by pleating) can result in 4- to 8-fold longer lifetimes. Preferably in this regard, the folds are narrow enough for as many filter surfaces as possible to be accommodated in a cartridge, to an extent that in the case of cleaning via a pressure surge, the filtered condensate can still be cleaned well (i.e. comes out of the folds). Preferably, a filter comprises 100 to 300 folds for a filter diameter of at least 20 cm. Even though a higher value for the number of folds is better, care must be taken that a fold which is too narrow would have a negative effect on the capability of the filter to be cleaned. Preferably, the fold depth is at least 20 mm, more preferably at least 30 mm.

In accordance with a further preferred filter system, a dirty gas side of the permanent filter coming into contact with the process gas to be purified has a rounded meandering shape at least in regions, for example a wave shape or meandering rectangular shape. The width of the respective structures (corresponds to a wavelength of a wave structure) is preferably more than 1 cm, preferably more than 2 cm and/or preferably less than 10 cm, preferably less than 4 cm. Preferably, the depth of the structures is at least 20 mm, more preferably at least 30 mm. Preferably, a filter comprises 100 to 300 of these structures for a filter diameter of at least 20 cm.

Preferably, a filter surface of a single permanent filter amounts to at least 0.5 m², preferably at least 1 m², particularly preferably at least 3 m² (m²=square metre). For large units with high volume flows, a larger surface is sensible, but this can also be obtained by mounting a plurality of filters in parallel and/or by mounting a plurality of filter chambers in parallel. Because a larger surface area also increases the susceptibility of the filters to mechanical stresses, the filter surface area is preferably at most 20 m², in particular at most 3 m² per cartridge, for example 2 m² per cartridge.

In accordance with a preferred filter system, the permanent filter is a cartridge filter and/or a plate filter, preferably with a meandering cross section.

In accordance with a preferred filter system, the permanent filter is disposed in the filter system in a manner such that a dirty gas side coming into contact with the process gas to be purified is an outer surface of the permanent filter.

As an alternative or in addition, the permanent filter is preferably disposed in the filter system in a manner such that a dirty gas side coming into contact with the process gas to be purified is an inner surface (lying inside the filter) of the permanent filter. This variation with the inner dirty gas side has the advantage that the cleaned condensate remains on the interior of the filter, resulting in a reduced risk of fire upon exchange and therefore a reduced risk to the operator in the event of operator error. In addition, in the case of inerting upon removal of the filter plates, the inert gas can be used more effectively (i.e. saving costs because of the smaller volumes required). In addition, a solid inerting agent could be envisaged, for example sand and/or expanded glass granulate. The advantage of a variation with an outwardly lying and inwardly lying filter surface is the gain in filter surface area for the same external circumference.

In accordance with a preferred filter system, the permanent filter is configured in a manner such that particles cleaned off the permanent filter can be (directly) used as build material in a (fresh) additive manufacturing process. The metal condensate which collects in a collecting container after being cleaned off the filter can then be recycled, if necessary without purification, in particular because metal filters have untreated surfaces.

In accordance with a preferred filter system, the permanent filter is configured in a manner such that an oxidation reaction of particles present in the permanent filter can be initiated (triggered), wherein the permanent filter is preferably coupled to an energy input source, and preferably a metal fabric or a portion of a metal fabric of the permanent filter constitutes a heating element. In particular, the filter comprises insulated wires (for example in a mesh) which constitute the heating. Preferably, a metal fabric of the filter serves for active resistance heating. The advantage of heating of this type is that chemical processes such as oxidation, for example, can be triggered in a controlled manner, so that the filter cake can be worked off the filter directly in a specific or controlled reaction.

In accordance with a preferred embodiment, the permanent filter, in particular a metal filter of the permanent filter, comprises a surface coating. In this regard, the surface coating, for example a PTFE membrane coating, preferably functions to reduce the adhesive forces with which the particles, for example metal condensate or metal powder, adhere to the surface of the permanent filter and therefore enhances the cleaning capability or reduces a priori the deposition of particles and produces stronger surface filtration. In this regard, an exemplary surface coating is or comprises a vapour deposited PTFE layer, preferably with a thickness on the nanometric scale (preferably thicker than 1 nm, preferably thinner than 1000 nm). Because the surface coating is so thin, no additional risk of fire arises. Preferably, the surface coating constitutes an initial filter cake, for example a layer of extremely fine sintered metal; again, this layer prevents the deposition of dust. In this manner, the permanent filter becomes a surface filter.

In a preferred process for additive manufacturing, purification of process gas and/or cleaning of the permanent filter is carried out in a manner such that particles cleaned from the permanent filter can be used as build material in a (fresh) additive manufacturing process.

Preferably, the permanent filter of the filter system is configured for this purpose and disposed in the filter system in a manner such that cleaning of the permanent filter can be carried out in a cleaning operation for the filter system which runs in parallel to a build process of the manufacturing device. "Online cleaning" of this type, i.e. cleaning without interrupting the build job, is preferably carried out at a lower pressure than cleaning during an interruption to the build job or between build jobs, which are usually carried out at approximately 5 bar. A preferred pressure range for online cleaning is between 2 and 5 bar.

Preferably, at least two filter chambers mounted in parallel are used, wherein during cleaning, one is separated from the gas flow. As an example, the region around it could be enriched in oxygen (and this filter chamber could be heated) and the filter cake could be oxidized in a controlled manner without affecting or endangering the build process.

In a preferred process for additive manufacturing, cleaning of the permanent filter is carried out during the (running) additive manufacturing process, in particular without interrupting the manufacturing process.

In a preferred process for additive manufacturing, cleaning of the permanent filter is carried out as a function of a differential pressure value in the process gas (across the permanent filter). To this end, a preferred differential pressure value is at least mbar, preferably at least 20 mbar, preferred at least 30 mbar, particularly preferably at least 40 mbar. As an alternative or in addition, a cleaning pressure surge for cleaning the permanent filter is less than 5 bar, preferably less than 4 bar, preferred less than 3 bar, particularly preferably 2.5 bar. However, this pressure depends on the surface and the form of the permanent filter. Preferably, a cleaning pressure surge may be more than 2 bar or preferably more than 3 bar, in particular more than 4 bar. Preferably, the filter system has a buffer volume which traps the pressure surge.

BRIEF DESCRIPTION OF THE DRAWINGS

The invention will now be explained again in more detail with reference to the accompanying figures and with the aid of exemplary embodiments. In this regard, in the various figures, identical components are provided with identical reference numerals. The figures are generally not to scale. In the figures.

DETAILED DESCRIPTION OF THE EMBODIMENTS

Figure 1:
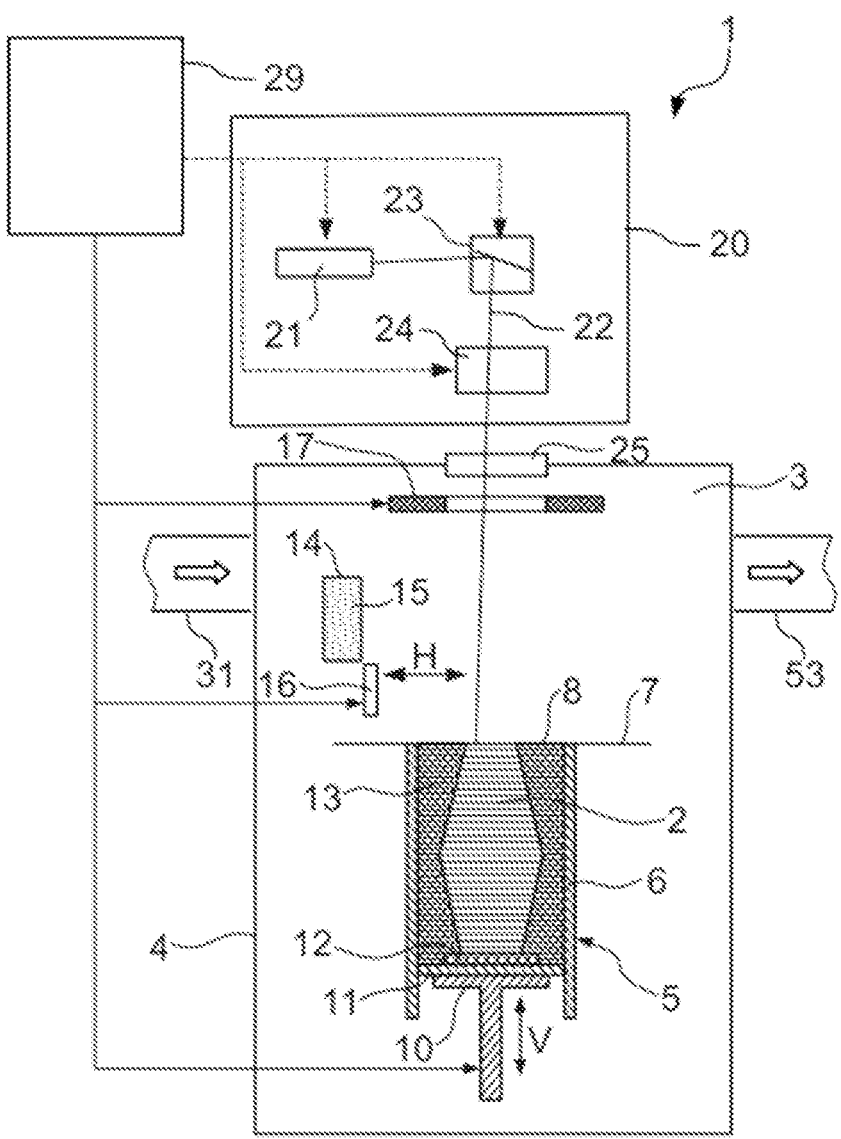
FIG. 1 shows a diagrammatic, partially sectional view of a device for the generative manufacture of a three-dimensional object.

A device for the generative production of a three-dimensional object will be described below with reference to FIG. 1. The device shown in FIG. 1 is a laser sintering or laser melting device 1. In order to build an object 2, it contains a process chamber 3 with a chamber wall 4.

A container 5 which is open at the top and has a container wall 6 is disposed in the process chamber 3. A working plane 7 is defined by the upper opening of the container 5, wherein the region of the working plane 7 lying inside the opening, which can be used to build the object 2, is defined as the build zone 8. In addition, the process chamber 3 comprises a process gas feed 31 associated with the process chamber as well as an outlet 53 for process gas.

A support 10 which can be moved in a vertical direction V is disposed in the container 5; a base plate 11 which closes the bottom of the container 5 and therefore forms its base is attached to it. The base plate 11 may be a plate which is formed separately from the support 10, to which the support 10 is secured, or it may be formed integrally with the support 10. Depending on what powder and process is employed, a further build platform 12 may be attached to the base plate 11 as a build substrate, on which the object is built. However, the object 2 may also be built on the base plate 11 itself; it then acts as the build substrate. FIG. 1 shows the object 2 to be built in the container 5 on the build platform 12 below the working plane 7 in an intermediate position with a plurality of solidified layers, surrounded by unsolidified remaining build material 13.

The laser sintering device 1 furthermore contains a reservoir 14 for a powdered build material 15 which can be solidified by electromagnetic radiation, and a recoater 16 which can be moved in a horizontal direction H to apply the build material inside the build zone 8. Preferably, the recoater 16 extends transversely to its direction of movement over the entire region to be coated.

Optionally, a radiant heating system 17 is disposed in the process chamber 3 and serves to heat the build material 15 which has been applied. The radiant heating system 17 may, for example, be an infrared heater.

Furthermore, the laser sintering device 1 contains an illumination device 20 with a laser 21 which produces a laser beam 22 which is deflected by means of a deflection device 23 and is focused onto the working plane 7 by means of a focusing device 24 via a coupling window 25 which is mounted on the top of the process chamber 3 in the chamber wall 4.

Furthermore, the laser sintering device 1 contains a control unit 29, by means of which the individual components of the device 1 can be controlled in a coordinated manner in order to carry out the build process. As an alternative, the control unit may also be mounted in part or entirely outside the device. The control unit may contain a CPU the operation of which is controlled by means of a computer program (software). The computer program may be stored in a storage medium separately from the device, from which it can be uploaded into the device, in particular into the control unit.

Preferably, a powdered material is used as the build material 15, wherein in particular, the invention is directed towards build materials which form metal condensates. In the context of an oxidation reaction and therefore a risk of fire, in particular, iron and/or titanium-containing build materials may be cited, but copper, magnesium, aluminium, tungsten, cobalt, chromium and/or nickel-containing materials as well as compounds containing such elements may also be cited.

During operation, in order to apply a layer of powder, firstly, the support 10 is dropped by a height which corresponds to the desired layer thickness. The recoater 16 initially travels to the reservoir 14 and takes from it a sufficient quantity of the build material 15 to apply a layer. Next, it travels over the build zone 8, bringing powdered build material 15 to the build substrate or to a layer of powder which has already been put in position, and draws it out into a layer of powder. Application is carried out over at least the entire cross section of the object 2 to be produced, preferably over the entire build zone 8, i.e. the region delimited by the container wall 6. Optionally, the powdered build material 15 is heated to a working temperature by means of a radiant heating system 17.

Next, the cross section of the object 2 to be produced is scanned by the laser beam 22 so that the powdered build material 15 is solidified at those positions which correspond to the cross section of the object 2 to be produced. In this regard, the powder particles at these positions are partially or completely melted by the energy applied by the radiation, so that after cooling, they are bonded together into a solid body. These steps are repeated until the object 2 is complete and can be removed from the process chamber 3.

Figure 2:
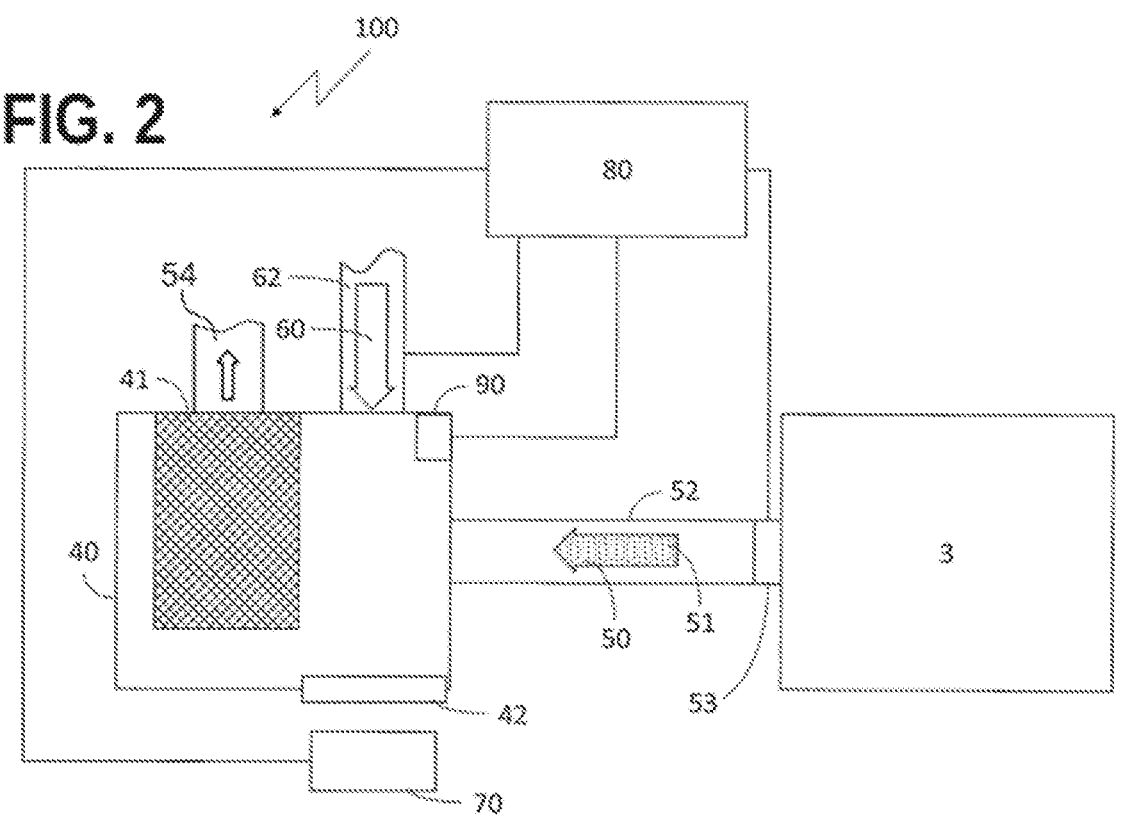
FIG. 2 shows a diagrammatic, partially sectional view of a of a filter system for filtering a process gas.

FIG. 2 shows a diagrammatic, partially sectional view of a filter system 100 for filtration and here also for the post-treatment of particles 51 entrained in a process gas 50 of a device for the generative manufacture of three-dimensional objects, in combination with a device 1 according to FIG. 1 in accordance with a first embodiment of the present invention. The particles 51 and the process gas 50 entraining the particles are represented by the appropriate arrow. The process gas 50 entraining the particles 51 is discharged via an outlet 53 into the feed 52 supplying the process gas 50 to the filter chamber 40 out of the process chamber 3, for example by suction. In addition to an inlet for the feed 52 of the process gas 50 and the entrained particles 51, the filter chamber 40 has an inlet for oxidizing agent 60 supplied via an oxidizing agent feed 62 for post-treatment, also shown as an appropriate arrow. In this manner, the oxidizing agent feed 62 is directed onto the process gas 50 entraining the particles 51 coming out of the feed 52 in a manner such that the oxidizing agent 60 can permeate the environment of the particles 51 in the region where the oxidation reaction will be triggered, as will be described below. Here, the means for triggering the oxidation reaction is an energy input source 70 configured as a radiant heating system, which couples its heat radiation into the filter chamber 40 via a transparent region 42 thereof and is absorbed by the particles 51 entrained in the process gas 50 so that they are heated up in a specific manner. The feed of the oxidizing agent 60 to the environment of the particles 51 in combination with the particle temperature produced by the energy input source 70 leads to an oxidation reaction in which the particles 51 are burned off in a controlled manner and/or are at least passivated in a controlled oxidation reaction so that their burning and explosive tendencies are sufficiently inhibited. The process gas 50 entraining the particles 51, or rather now the particle residues, is then discharged through the (thermally stable) filter 41 on which the particles 51 or particle residues remain in accordance with the filter characteristics. The filtered process gas can then leave the filter 41 from a clean gas outlet 54 and, for example, be recycled to a process via a process gas feed 31 (see FIG. 1, for example).

In addition, the filter system 100 may have a separator (not shown), so that particles formed by unsolidified build material 13 can be separated out of the process gas 50 so that they are not fed to the post-treatment system.

In the embodiment of FIG. 2, the oxidizing agent feed 62, the feed 52 for the process gas 50 and the energy input source 70 are disposed in a manner such that the oxidation reaction can be triggered by the energy input source 70 in the environment of the particles in which the oxidizing agent 60 meets the process gas 50 entraining the particles 51 and thereby mixes through the particle environment. As an alternative, the particles 51 entrained in the process gas 50 may also, however, be initially heated to a temperature which can then trigger an oxidation reaction when the particles 51 encounter the oxidizing agent 60. Similarly, the energy input for triggering the oxidation reaction may only occur when mixing of the particle environment with the oxidizing agent 60 has already taken place, as long as the oxidizing agent content is still sufficient. This is from both a spatial and a chronological viewpoint.

Furthermore, the filter system 100 in FIG. 2 has a controller 80 which can control the oxidizing agent feed 62 and therefore the quantity of the oxidizing agent 60 supplied to the filter chamber, for example via valves, the outlet 53 and therefore the quantity of process gas 50 and particles 51 entrained therein as well as the energy input source 70. For the automatic control of at least one of these devices, which can be controlled by the controller 80, a process monitoring system 90 is provided which monitors at least the oxidizing agent content, the quantity of particles or the temperature in the filter chamber 40. Automatic control is undertaken by the controller 80, but may also be undertaken by a unit which is separate therefrom. The controller 80 can also be included in the control unit 29 of the laser sintering device 1, or it may be associated with the filter system 100.

Figure 3:
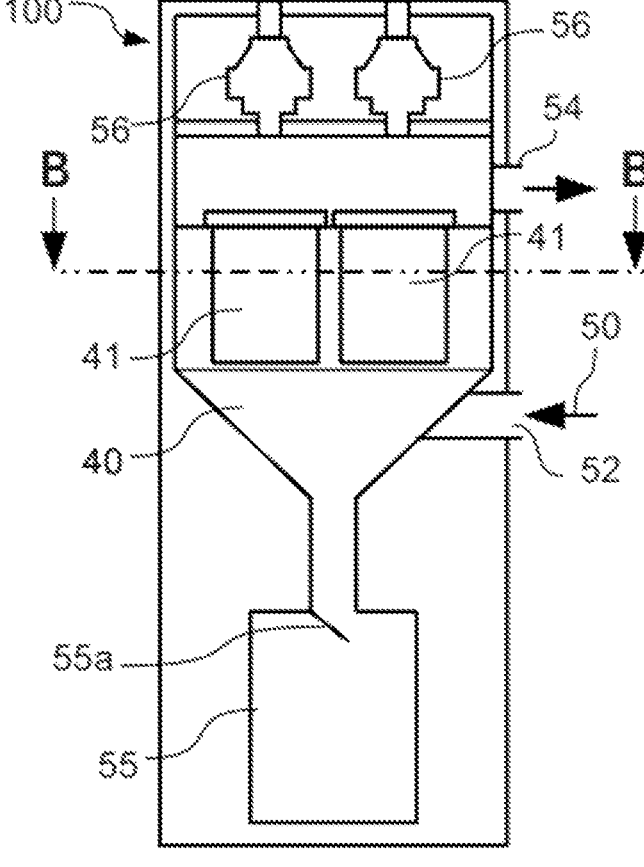
FIG. 3 shows a diagrammatic, partially sectional view of a filter system for filtering a process gas.

FIG. 3 is a diagrammatic partially sectional view of a filter system 100 for filtering a process gas 50. The process gas 50 enters through a dirty gas inlet (feed 52) into the filter system 100. The line shown as a feed 52 comes from the exhaust from a process chamber (see FIG. 1, for example). The entering process gas 50 then flows through the filter chamber 40, which here is in the form of a funnel, which opens into the particle collecting container 55. Larger particles impact against the edge of the filter chamber 40 and drop directly into this particle collecting container 55; lighter particles are entrained further with the process gas and are filtered out of the process gas 50 by means of the permanent filter 41. Above the filters are cleaning units 56 with tanks which can clean the filter 41 by means of cyclic pressure surges. Particles removed from the filters 41 drop into the particle collecting container 55. The filtered process gas exits the filter system 100 from the clean gas outlet 54.

Figure 4:
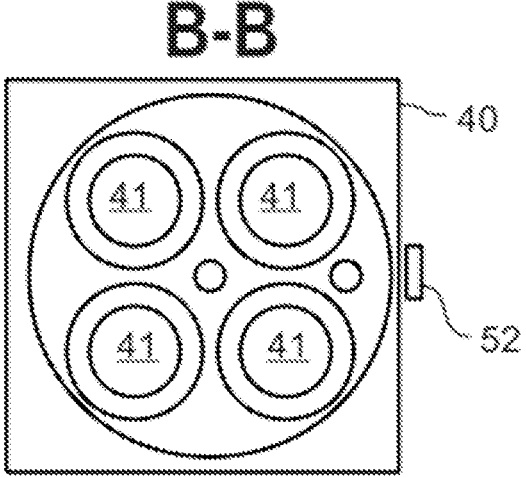
FIG. 4 shows a diagrammatic sectional view of FIG. 3.

FIG. 4 is a diagrammatic sectional view of FIG. 3. Four permanent filters 41 can be clearly seen which are configured as filter cartridges, along with a central tube which opens into the particle collecting container 55 and can be closed by a shut-off valve 55a to prevent particles from getting out when the particle collecting container 55 is exchanged.

Figure 5:
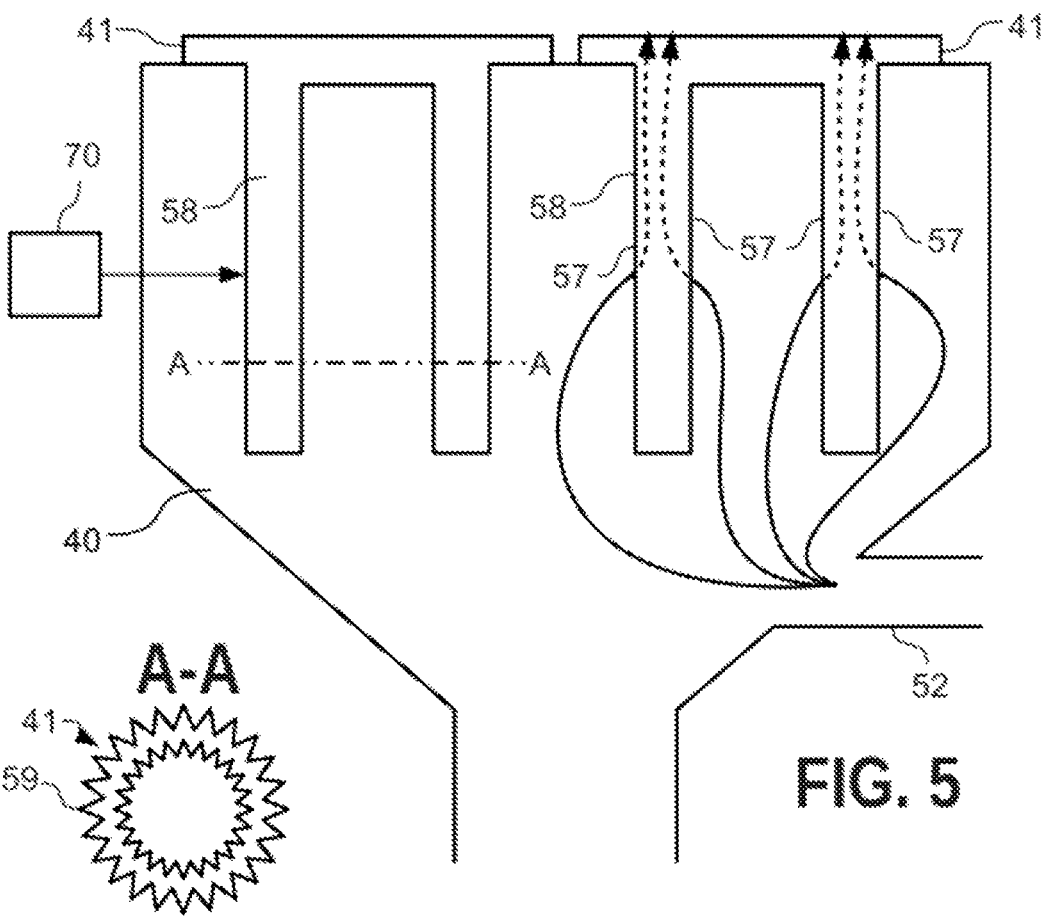
FIG. 5 shows a diagrammatic side view of a filter system for filtering a process gas.

FIG. 5 is a diagrammatic sectional side view of a filter chamber 40 of a filter system 100 for filtering a process gas 50 as can be seen, for example, in FIG. 3. A particular feature is the permanent filters 41 which here are hollow cylinders with a pleated filter material 58 (in the form of folds 59) (see also section A-A in this regard). Both the pleating and also the configuration as a hollow cylinder with a respective inner and outer dirty gas side 57 results in an enlargement of the effective filter surface area.

In this example, the filter system 100 comprises, for the left filter 41, an energy input source 70 with which the filter 41 is coupled. This energy input source 70 serves here to heat up a metal fabric in the filter material 58 so that the filter 41 constitutes a heating element. This serves to bring about a controlled oxidation of the filtered particles. The heating action may be obtained by forming wires of the filter 41 as (insulated) heating wires and the energy input source 70 supplies these wires with current.

Figure 6:
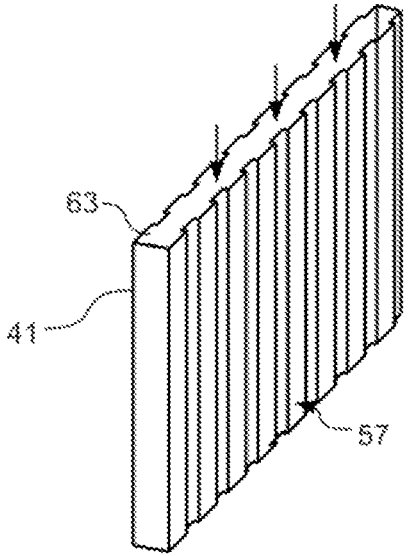
FIG. 6 shows a diagrammatic perspective view of a further preferred permanent filter in the form of a plate filter.

FIG. 6 is a diagrammatic perspective view of a further preferred permanent filter 41. This is configured as a filter plate with an outer dirty gas side. A process gas flow (not shown here) penetrates into the filter 41 from outside and particles are filtered out on the dirty gas side 57. The purified process gas flow exits the filter 41 at a top end 63 against the direction of the arrows. For purification, an inert gas is blown into the filter in the direction of the arrows.

Finally, it will be indicated once again that the figures described above in detail are solely by way of exemplary embodiments which could be modified by the person skilled in the art in different manners without going beyond the scope of the invention. Furthermore, the use of the indefinite article "a" or "an" does not exclude the fact that the features in question may also be present in multiples. Similarly, the term "unit" does not exclude the fact that this could consist of a plurality of cooperating sub-components which may also be distributed spatially, if appropriate.

LIST OF REFERENCE NUMERALS 1 laser melting device
2 object/component
3 process chamber
4 chamber wall
5 container
6 container wall
7 working plane
8 build zone
10 support
11 base plate
12 build platform
13 build material
14 reservoir
15 build material
16 recoater
17 radiative heating
20 irradiation device/illumination device
21 laser
22 laser beam
23 deflection device/scanner
24 focusing device
25 coupling window
29 control unit
31 process gas feed
40 filter chamber
41 filter/permanent filter
42 transparent region
50 process gas
51 particles
52 feed
53 outlet
54 clean gas outlet
55 particle collecting container
55a shut-off valve
56 cleaning unit
57 dirty gas side
58 filter material
59 fold
60 oxidizing agent
62 oxidizing agent feed
70 energy input source
80 control
90 process monitoring
100 filter system
H horizontal direction
V vertical direction

The invention claimed is:

1. An additive manufacturing device for manufacturing a component in an additive manufacturing process, the additive manufacturing device comprising:
   a process chamber;
   a feed system for introducing a build material into the process chamber in layers;
   an irradiation unit for selectively solidifying the build material in the process chamber; and a filter system for purifying a process gas of the additive manufacturing device, the filter system comprising:

a permanent filter that is regenerable and configured to remain installed during repeated operating cycles; and a cleaning arrangement configured to clean the permanent filter in situ by a reverse-flow cleaning gas pulse to remove collected particles.

2. The additive manufacturing device of claim 1, wherein the filter system comprises a filter chamber having a transparent region, and an energy input source configured as a radiant heating system disposed to couple heat radiation into the filter chamber through the transparent region to heat particles entrained in the process gas.

3. The additive manufacturing device of claim 1, wherein the permanent filter is configured to be thermally stable at a temperature of more than 150° C.

4. The additive manufacturing device of claim 1, wherein the permanent filter comprises a metal filter and/or a ceramic filter and/or a glass wool filter, wherein the metal filter is constructed from at least one corrosion-resistant steel and/or from a nickel-based alloy and/or from copper and/or from mixtures or alloys thereof.

5. The additive manufacturing device of claim 1, wherein a mesh size of a filter material of the permanent filter is between 0.5 μm and 30 μm.

6. The additive manufacturing device of claim 1, wherein the permanent filter comprises a support structure designed to support a filter surface of the permanent filter, wherein the support structure runs parallel to a filter material of the permanent filter, in at least a subarea on a dirty gas side and/or on a clean gas side of the permanent filter, or is integrated into the permanent filter.

7. The additive manufacturing device of claim 1, wherein a diameter of filaments and/or wires which form a filter material of the permanent filter is less than 20 μm, wherein a diameter of wires that form a support structure is more than 100 μm in thickness.

8. The additive manufacturing device of claim 1, wherein a dirty gas side of the permanent filter coming into contact with the process gas to be purified has a meandering pleated surface, at least in regions, wherein folds are disposed in the meandering pleated surface in order to form a pleated surface of the dirty gas side, wherein the folds for pleating are folds in a continuous fabric or are welded together and/or bonded together.

9. The additive manufacturing device of claim 1, wherein the permanent filter is disposed in the filter system in a manner such that a dirty gas side coming into contact with the process gas to be purified is an outer surface of the permanent filter and/or wherein the permanent filter is disposed in the filter system in a manner such that the dirty gas side coming into contact with the process gas to be purified is an inner surface of the permanent filter.

10. The additive manufacturing device of claim 1, wherein the permanent filter is configured in a manner such that an oxidation reaction of particles present in the permanent filter can be initiated, wherein the permanent filter is coupled to an energy input source, and a metal fabric or a portion of a metal fabric of the permanent filter constitutes a heating element.

* * * * *